US009363313B2

(12) United States Patent
Kumar

(10) Patent No.: US 9,363,313 B2
(45) Date of Patent: Jun. 7, 2016

(54) REDUCING VIRTUAL IP-ADDRESS (VIP) FAILURE DETECTION TIME

(75) Inventor: Mahesh Kumar, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 186 days.

(21) Appl. No.: 13/493,694

(22) Filed: Jun. 11, 2012

(65) Prior Publication Data

US 2013/0332597 A1 Dec. 12, 2013

(51) Int. Cl.
| | |
|---|---|
| *G06F 15/173* | (2006.01) |
| *H04L 29/08* | (2006.01) |
| *H04L 12/24* | (2006.01) |
| *H04L 29/12* | (2006.01) |

(52) U.S. Cl.
CPC ........ *H04L 67/1008* (2013.01); *H04L 41/0896* (2013.01); *H04L 67/1029* (2013.01); *H04L 61/1511* (2013.01)

(58) Field of Classification Search
None
See application file for complete search history.

(56) References Cited

U.S. PATENT DOCUMENTS

| | | | | |
|---|---|---|---|---|
| 5,608,446 A * | 3/1997 | Carr et al. | | 725/114 |
| 5,987,621 A * | 11/1999 | Duso | | G06F 11/2023 |
| | | | | 348/E5.008 |
| 6,055,575 A * | 4/2000 | Paulsen et al. | | 709/229 |
| 6,760,775 B1 * | 7/2004 | Anerousis et al. | | 709/238 |
| 6,856,591 B1 * | 2/2005 | Ma | | H04L 41/0631 |
| | | | | 370/216 |
| 7,036,051 B1 * | 4/2006 | Fernandes | | 714/55 |
| 7,082,130 B2 * | 7/2006 | Borella | | H04L 12/5602 |
| | | | | 370/219 |
| 7,152,179 B1 * | 12/2006 | Critchfield | | H04L 12/2602 |
| | | | | 714/4.11 |
| 7,657,629 B1 * | 2/2010 | Kommula | | 709/226 |
| 7,676,576 B1 * | 3/2010 | Kommula | | 709/226 |
| 7,689,722 B1 * | 3/2010 | Timms et al. | | 709/249 |
| 7,707,308 B1 * | 4/2010 | Hogge et al. | | 709/239 |
| 7,898,942 B2 * | 3/2011 | Takagi et al. | | 370/222 |
| 8,504,721 B2 * | 8/2013 | Hsu et al. | | 709/245 |
| 2003/0005350 A1 * | 1/2003 | Koning | | H04L 67/1002 |
| | | | | 714/4.11 |
| 2003/0229697 A1 * | 12/2003 | Borella | | 709/226 |
| 2004/0268358 A1 * | 12/2004 | Darling | | H04L 29/06 |
| | | | | 718/105 |
| 2005/0147028 A1 * | 7/2005 | Na | | H04L 45/00 |
| | | | | 370/217 |
| 2006/0168192 A1 * | 7/2006 | Sharma | | G06F 11/2028 |
| | | | | 709/224 |

(Continued)

OTHER PUBLICATIONS

Wei, Xie, Liu Hongmei, and Huan Honglun. "Global Dynamic Load Balancing Based on Data-Omitting (GDLBD)" Journal of Systems Science & Information 5.2 (2007): 151-166. Computers & Applied Sciences Complete.*

(Continued)

*Primary Examiner* — Scott B Christensen
*Assistant Examiner* — Lam Do
(74) *Attorney, Agent, or Firm* — Haynes and Boone, LLP

(57) ABSTRACT

Methods and systems are provided for global server load balancing in a communication network using a global site selector and an application control engine in communication with the global site selector, in which the application control engine notifies the global site selector in response to a state change for a virtual internet protocol (VIP) address. Keepalive methods generally rely on periodically polling VIP addresses to check whether they are in an ONLINE or OFFLINE state. A minimum interval between two keepalives can be as long as 40 seconds, during which, without a mechanism to reflect state change to the load balancer in real time, if a VIP address changes state (e.g., VIP address failure), a customer can experience network outage during the time interval. Embodiments provide a mechanism to reflect, in real time, the current VIP address state to a global server load balancer to reduce failure detection time.

17 Claims, 3 Drawing Sheets

(56) References Cited

U.S. PATENT DOCUMENTS

| | | | |
|---|---|---|---|
| 2006/0179147 A1* | 8/2006 | Tran | G06F 11/2012 709/227 |
| 2006/0253605 A1* | 11/2006 | Sundarrajan et al. | 709/238 |
| 2007/0086350 A1* | 4/2007 | Haberkorn et al. | 370/242 |
| 2010/0036954 A1* | 2/2010 | Sakata et al. | 709/226 |
| 2010/0121932 A1* | 5/2010 | Joshi et al. | 709/207 |
| 2012/0096166 A1* | 4/2012 | Devarapalli et al. | 709/226 |
| 2012/0124431 A1* | 5/2012 | Bauer et al. | 714/55 |
| 2013/0033978 A1* | 2/2013 | Eckert | H04L 45/16 370/216 |

OTHER PUBLICATIONS

Diasse, Aissatou, and Foroski Kone. "Dynamic-Distributed Load Balancing for Highly-Performance and Responsiveness Distributed-GIS (D-GIS)." Journal of Geographical Information Systems 3.2 (2011): 128-139. Computers & Applied Sciences Complete.*

Seok-Pil, Lee, and Nahm Eui-Seok. "A New Approach to Modelling of Linux Virtual Server Based on Performance Metrics Using an Optimal Load Balancing Algorithm." International Journal of Software Engineering & Its Applications 6.2 (2012): 191-196. Computers & Applied Sciences Complete.*

Staff. "Foundry Networks Announces Availability of Web Firewall and Bandwidth Optimization for ServerIron 4G Application Switches; TrafficWorks Release 10.0 Introduces Support for Web Application Security and HTTP Compression on ServerIron 4G and ServerIron 4G-SSL." Primezone Media Network (USA) Mar. 28, 2007: NewsBank.*

* cited by examiner

REDUCING VIRTUAL IP-ADDRESS (VIP) FAILURE DETECTION TIME

TECHNICAL FIELD

The present disclosure generally relates to global server load balancing for communication networks and, more particularly, to reducing virtual IP address failure detection time.

BACKGROUND

Business continuance and disaster recovery planning, once considered low business priorities, have recently received increased attention, in the form of information technology (IT) professionals' focus on deploying business continuance and disaster-recovery network architectures that can withstand an array of disruptions ranging from catastrophic natural disasters, to acts of terrorism, to technical failures. To avoid costly disruptions—and improve customer service—enterprises may turn to intelligent networking capabilities to distribute and load balance their corporate data centers, where many of their core business applications reside. The intelligence now available in networking devices can inspect many variables about the content of an internet protocol (IP) packet, and, based on the information, direct traffic to the best-available, least-loaded sites and servers that will provide the fastest—and best—response.

A network using global server load balancing (GSLB) may direct users to the most appropriate data centers for their requests, improving the end-user experience. For example, a software manufacturer may offer its product via download from its Internet site but then the software manufacturer encounters customer satisfaction issues when download time is too long. An intelligent GSLB solution can determine which of the manufacturer's multiple data centers, located in disparate locations with mirrored content, is closest to the requesting client. A client in Asia can then receive content from a data center in Asia; a client in Europe can receive content from Europe; and a client in North America can receive content from North America. The result can be drastically reduced wait times for software downloads and increased customer satisfaction. In addition, an intelligent GSLB solution that can point the client to a local data center for content requests, instead of one located remotely, can save costly bandwidth and reduce the need for upgrades, saving upgrade expenses.

DESCRIPTION

Overview

Figure 1:
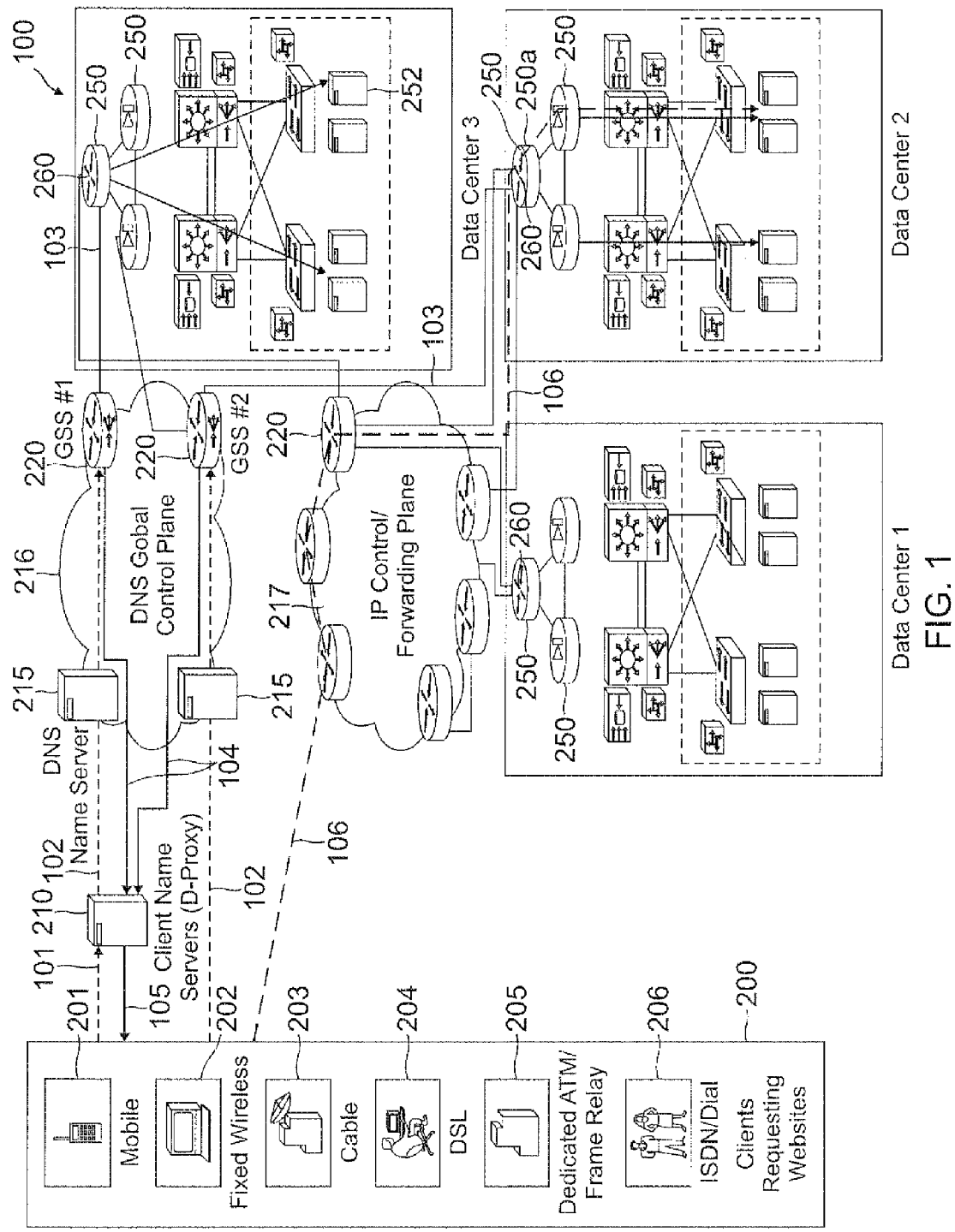
FIG. 1 is a system diagram illustrating a communication network implementing global server load balancing in accordance with one or more embodiments.

In accordance with embodiments of the present invention, methods and systems are provided for global server load balancing in a communication network using a global site selector and an application control engine in communication with the global site selector, in which the application control engine notifies the global site selector in response to a state change for a virtual internet protocol (VIP) address.

Description of Example Embodiments

In accordance with embodiments of the present invention, methods and systems provide a VIP address state notification mechanism to reflect, in real time, the current VIP address state to a global server load balancer to reduce failure detection time for global server load balancing (GSLB). Failure detection time is a basic issue related to global server load balancing and refers to the amount of time from when a VIP address goes down (or enters an OFFLINE state) until the global server load balancer "knows" about the VIP address being down and stops referring network traffic to that VIP address. In one or more embodiments, global server load balancing in a communication network is performed by a global site selector (GSS) and an application control engine (ACE) in communication with the global site selector, in which the application control engine notifies the global site selector in response to a state change for a virtual internet protocol (VIP) address.

A keepalive, as generally known in the art, is a message sent by one device to another to check that the link between the two is operating or to prevent the link from being broken. One of the basic issues with global server load balancing in general are keepalive methods that rely on periodically polling VIP addresses for their status to check whether they are in an ONLINE state or OFFLINE state, causing the potential for a customer to experience network outages in the interval between keepalives. For example, a minimum interval between two keepalives can last for several seconds, during which, without a mechanism to reflect the state change on the global site selector in real time, if a VIP address changes state (e.g., a VIP address failure), a customer can experience a network outage during the time interval. To address the issue, one or more embodiments provide a VIP address state notification mechanism to reflect, in real time, the current VIP address state to a global server load balancer to reduce failure detection time. For example, an application control engine may send a notification to a global site selector of a global server load balancer as soon as VIP address state changes from ONLINE to OFFLINE and vice-versa. Thus, in one or more embodiments, the customer may not experience network outage caused by minimum keepalive intervals on the global site selector. In addition, the VIP address state notification mechanism can, in some implementations, reduce keepalive processing so that a keepalive engine of a global site selector has a reduced processing load.

FIG. 1 illustrates a system 100 in accordance with one or more embodiments for performing global server load balancing in a communication network. Global server load balancing (using, for example, global site selectors 220 in accordance with one or more embodiments) can offload the website selection process from the domain name system (DNS) infrastructure (including, e.g., client name server (D-proxy) 210; DNS name servers 215, DNS global control plane 216). In the process of global server load balancing, global site selectors 220 may monitor the load and health of multiple server load balancers 250, each hosting multiple VIP addresses. A virtual IP address (VIP address) may be described as an IP address that is not connected to a specific computer or network interface card (NIC) on a computer. Incoming packets sent to the VIP address may be redirected to physical network interfaces and so that a VIP address can be shared among multiple domain names or multiple servers. A virtual IP address may eliminate a host's dependency upon individual network interfaces so that a VIP address may still be available if a computer or NIC fails, because an alternative computer or NIC may reply to connections. Thus, VIPs are extensively used for connection redundancy and provide a basic tool for global server load balancing.

Server load balancers 250 may be co-located at a data center, as seen in FIG. 1, or may be located at remote and disparate data centers, also as seen in FIG. 1. As described in the following example, with reference to items 101 to 106, global site selectors 220 may interact with the client (e.g., client 200) in the website selection process. In one or more embodiments, a proximity deployment may be used for global server load balancing to route the client to the "closest" data center to achieve better customer Web experience and save expensive wide-area bandwidth. A proximity deployment for global server load balancing may be critical for applications that involve the transfer of large volumes of data, require a global presence, or rely on real-time interaction with remote users. Global site selectors, application control engines, server load balancers, task managers, and other described modules and functions may be implemented using hardware, or a combination of hardware with firmware, software, or both.

A user of a client 200 (e.g., a client device or a processor running a client application) may want to access an application or website at, for example, ABC.com. FIG. 1 illustrates that client 200 may include various types of client, including, for example, a mobile device 201, a fixed wireless device 202, a cable client 203, a digital subscriber line (DSL) client 204, a dedicated asynchronous transfer mode (ATM) frame relay 205, or integrated services digital network (ISDN) 206. The user of client 200 may initiate a DNS request 101, for example, by entering a link, such as "www.ABC.com", into a web browser running on the client 200. The application or website for ABC.com may be supported at a three different data centers, e.g., data center 1, data center 2, and data center 3, as seen in FIG. 1.

DNS request 101 may be processed by the DNS global control plane 216 infrastructure so that a DNS request 102 arrives at a global site selector 220. For example, the DNS request 101 may be sent to a local client name server (D-proxy) 210. The local D-proxy 210 may not have an IP address for www.ABC.com, so D-proxy 210 may send a query (DNS request) 102 to a DNS name server 215. The DNS name server 215 can respond to the DNS request 102 by sending it on, e.g., forwarding it, to a global site selector 220. A typical DNS name server cannot perform the following processes needed for global server load balancing, e.g., the site selection process: 1) determine if the devices within the data center are available or unavailable; 2) determine if the server within the data center is overloaded; 3) determine which server load balancer is the best performing; 4) determine which data center is closer to the client that is requesting content; 5) intelligently manage the client traffic flow to each data center; 6) react quickly to changes in availability or load on the devices within the data center; 7) provide data center persistence; and 8) give conditional responses, such as "data center one is unavailable and data center two is overloaded, so send all traffic to third data center".

A global site selector 220 receiving the DNS request 102 may offload the site-selection process from the DNS global control plane 216, for example, offloads DNS servers by taking over the domain resolution process and responding to thousands of requests (e.g., DNS request 102) per second. In the site selection process, global site selector 220 may send request 103 to a data center and site selection may be based on the load and health information from the data centers and sites, in conjunction, for example, with website provider-controlled load-balancing algorithms. The global site selector 220, in real time, may select a data center that is available and not overloaded based on information received from application control engines 260. Each data center (data centers 1, 2, and 3 in the example) may have one or more application control engines 260 executing, for example, on a load balancing server 250 or servers 250 and performing load balancing functions for its respective data center. Thus, each application control engine may be in communication with one or more global site selectors and, conversely, each global site selector may be in communication with one or more application control engines. Such communication between global site selectors 220 and application control engines 260 may be carried on using layer 3 (referring to the Open System Interconnection (OSI) model) communications 270 (also referred to as socket layer communications 270, see FIG. 2) and any suitable communication protocol such as UDP, ICMP, NS, KALAP (a Cisco, Inc. proprietary protocol), TCP, HTTP, or CRA, for example.

A global site selector 220 may send response 104 to D-proxy 210. Response 104 may include an IP address for a "best" server load balancer 250 at specific data center, which for purposes of this illustrative example, may be taken to be server 250a at data center 2. D-proxy 210 may send the IP address in response 105 to client 200, and a browser, for example, running on client 200 may process this IP address. When the transfer for the DNS control plane 216 is complete, the client 200 may be directed, using layer 3 communications 106, to the server load balancer 250a at data center 2 by the IP control and forwarding plane 217.

In selecting a data center or website based on information gathered, for example, from load balancing servers 250 or application control engines 260, a global site selector 220 may perform global server load balancing according to one or more of the following methods, which serve as examples and not limitations: 1) ordered list—use the next VIP address when all previous VIP addresses are overloaded or down; 2) static based on client's DNS address—maps the IP address of the client's DNS to available VIP addresses; 3) round robin—cycles through available VIP addresses in order; 4) weighted round robin—weighting causes repeat hits (up to 10, for example) to a VIP address; 5) least-loaded—communicates through a uniform datagram protocol (UDP) the least number of connections or least loaded server (e.g., load can be calculated based on how fast a server responds to a transmission control protocol (TCP) connection request); 6) source address and domain hash—the IP address of the client's DNS proxy and domain used always matches the same client to the same VIP address; 7) DNS race—initiates a race of A-record responses to the client's name server so as to estimate proximity without probing; and 8) drop—silently discards request.

Figure 2:
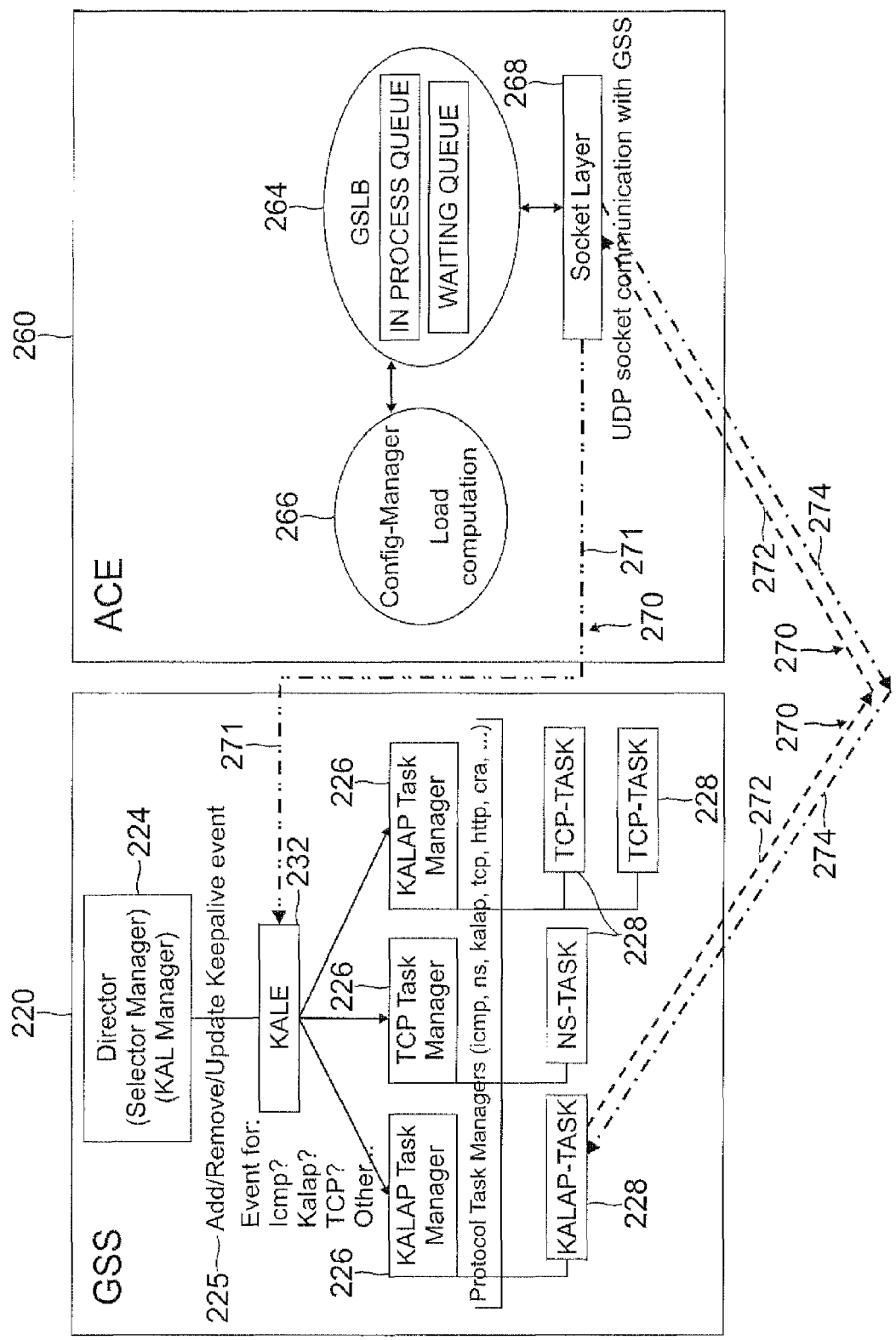
FIG. 2 is a system diagram illustrating a portion of the communication system of FIG. 1, in accordance with an embodiment.

Referring now to FIG. 2, a global site selector 220 and an application control engine 260, in communication with global site selector 220, for performing global server load balancing, as described with reference to FIG. 1, are shown in more detail. In one embodiment a communication 271 between the application control engine 260 and the global site selector 220 can replace the keepalive process operated by global site selector 220 with application control engine 260. In another embodiment, communication 271 may augment the keepalive process operated by global site selector 220 with application control engine 260.

In general, a keepalive performs a specific interaction, often referred to as "handshake," between two devices using a commonly supported protocol. A keepalive can test, for example, if a specific protocol stack on a networking device, such as a server, router, or switch, is functioning properly, using the following logic: a successful handshake means the target device is available, active, and able to receive traffic; a failed handshake means the target device is unavailable and inactive. This technique may allow the device issuing a keepalive (e.g., global site selector 220) to understand the operational status (e.g., whether a particular VIP address is available or in an ONLINE state) of the device responding to the keepalive (e.g., application control engine 260). Thus, a keepalive process may be an information collection mechanism of a global server load balancing process.

As shown in the example illustrated in FIG. 2, a keepalive process may be executed by a keepalive engine (KALE) 232, which may be implemented as hardware or a combination of hardware and firmware or software executing on global site selector 220. KALE 232 may execute under control or direction of a director process 224 (also referred to as a selector manager or keepalive (KAL) manager). The director process 224, may, for example, execute one or more global server load balancing methods (e.g., "ordered list", "static", "round robin", and so on) for providing a "best" VIP address to a client 200 as described above with reference to FIG. 1. An incoming client 200 request 102 may produce one of an add, remove, or update keepalive event 225 that is passed to KALE 232, KALE 232 may decide what the type or protocol is for event 225 and pass event 225 to the appropriate task manager 226. Each task manager 226 may manage a list of tasks 228 so that global site selector 220 sends a keepalive request 272 to application control engine 260 to get the status of a VIP address corresponding to the particular task 228 sending the keepalive request 272. (Request 272 and reply 274 each may be instances of layer 3 or socket layer communications 270.) The type or protocol for the keepalive may be, for example, any of KAL-AP, HTTP, ICMP, NS, CRA, or TCP.

KAL-AP—Extracts both load and availability from the server load balancers, e.g., server load balancers 250. When a detailed query (e.g., keepalive request 272) is sent to the server load balancers 250, an application control engine (ACE) 260 may respond (e.g., keepalive response 274) with information about a hosted domain name, hosted VIP address, or a configured tag on a content rule.

HTTP—The keepalive engine 232 may send a keepalive request 272 to a server 252 and check for a "200 OK." If the global site selector 220 receives a "200 OK," then it may direct traffic to the VIP address supporting that server.

ICMP—A simple layer 3 ping that shows the status of a given device based on connectivity to the network can be used with any device that can respond to a ping request. If there is no response, the ping will be sent once every five seconds up to three times. If there is still no response, the device (VIP address or real server) may be considered OFFLINE or to be in an OFFLINE state or unavailable.

NS-name server query—A simple DNS request May be sent to a host (name server, mail server, or other) to receive a resolved domain name to prove the "aliveness" of the system. In this case, the global site selector 220 may send a generic domain name, probing for a failure response, which proves that the DNS server is "alive", e.g., in an ONLINE state or available.

CRA (Content Routing Agent)—the global site selector 220 may send a UDP-based keepalive request 272 to port 1304 to retrieve round-trip times between the global site selector 220 and an agent (e.g., a server load balancer 250).

TCP—The TCP keepalive may be used when a global site selector 220 answer to be tested is transmitted to global server load balancing devices other than a server load balancer 250 including global server load balancing remote devices such as webservers, local directors, wireless access point (WAP) gateways, and other devices that can be checked using a TCP keepalive. The TCP keepalive may initiate a TCP connection to the remote device by performing a three-way handshake sequence. The TCP termination connection method can be graceful (FIN) or reset (RST).

Each type of global site selector keepalive described above may support a fast or standard keepalive rate. The fast keepalive rate can be as fast as four seconds, while the standard keepalive rate may be 40 to 255 seconds. For the fast keepalive rate, the number of retries for the ICMP, TCP, HTTP HEAD, and KAL-AP keepalive types can be adjusted, which adjusts the VIP failure detection time determined by the global site selector using keepalives. Thus, for standard type keepalive, the minimum interval between keepalives may be 40 seconds, so after each 40 seconds, the keepalive status (e.g., state of a VIP address being either ONLINE or OFFLINE) may be checked and updated based upon the reply 274. Thus, in a situation where a VIP address goes OFFLINE almost immediately after the most recent keepalive check, a network outage may be experienced for that VIP address lasting almost the entire 40 seconds.

To address such a situation (e.g., to prevent the possibility of such long network outages) an additional load and health information monitoring mechanism may be provided between, for example, a server load balancer 250 and a global site selector 220.

In one embodiment, an application control engine 260, executing on a server load balancer 250, may perform a number of server load balancing tasks and may use methods similar to those described above used by global site selector 220 for global server load balancing. The server load balancing and other management tasks (such as hosting VIP addresses) may be performed by a GSLB process 264, which may be implemented using hardware, or a combination of hardware with firmware, software, or both. A configuration manager process 266 may be used while creating a VIP address on application control engine 260 to specify a global site selector 220 IP address for VIP state change notification. For example, specifying such an IP address of global site selector 220 can enable sending a notification message 271 from a socket layer interface 268 to KALE 232 of global site selector 220. So when ever a particular VIP address goes ONLINE or OFFLINE, e.g., changes state, on the application control engine 260, application control engine 260 may notify global site selector 220 immediately in response to the change in state, in contrast, for example, to keepalive replies 274 which only notify global site selector 220 of the current state at periodic intervals, from which the global site selector 220 must infer a change of state by keeping track of the state.

Also, by sending the notification message 271 directly in response to a change in state of the VIP address, the VIP address status reflected on the global site selector 220 will always be current, e.g., the reflected status at the global site selector 220 changes in real time following, or tracking in real time, the VIP address status known at the application control engine 260. The feature of instant response to VIP address status changes can be implemented in such a way that a user (e.g., website operator or service provider) has flexibility to enable both keepalive (request 272, reply 274) and VIP status notification (notification messages 271) from application control engine 260 or have only one of them (either one) enabled. For example, configuration manager 266 may be used to set such an option.

Figure 3:
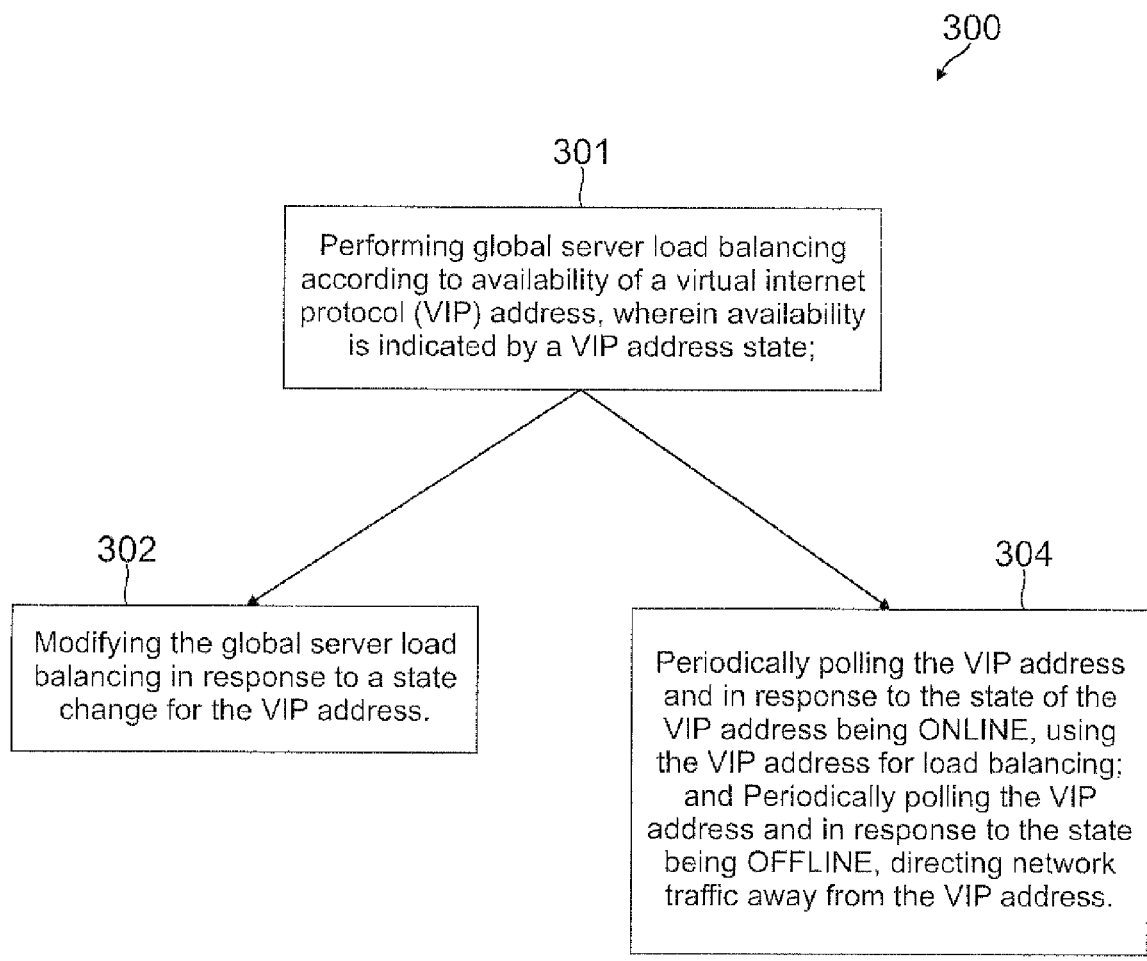
FIG. 3 is a process flow diagram illustrating a method in accordance with one or more embodiments.

FIG. 3 illustrates a method 300 in accordance with one or more embodiments. At step 301, method 300 may perform global server load balancing according to the availability of a virtual internet protocol (VIP) address. For example, availability may be indicated by a VIP address state, such as ONLINE or OFFLINE and the global server load balancing may be performed by a hardware switching unit, such as a global site selector 220. At step 302, method 300 may modify the global server load balancing in response to a state change for the VIP address. For example, a mechanism may be provided that notifies the performer of the global server load balancing, e.g., a global site selector 220, in real time and in direct response to the VIP address state changing; for example, a notification message 271 may be sent as shown in FIG. 2. Then, method 300 may modify the global server load balancing in response to message 271, for example, by redirecting traffic away from the VIP address if its state change is from ONLINE to OFFLINE or, for example, by redirecting traffic to the VIP address if its state change is from OFFLINE to ONLINE. At step 304, method 300 may also periodically poll the VIP address (e.g., by sending keepalive messages) and in response to the state of the VIP address being ONLINE, use the VIP address for load balancing, e.g., redirect traffic to the VIP address; and may also periodically poll the VIP address and in response to the state being OFFLINE, not use the VIP address for load balancing, e.g., redirect network traffic away from the VIP address. Either or both of steps 302 and 304 may be performed by method 300 without or along with performing the other step. Also, both steps 302 and 304 may be performed concurrently and independently of one another.

Therefore, it should be understood that the invention may be practiced with modification and alteration within the spirit and scope of the appended claims. The description is not intended to be exhaustive or to limit the invention to the precise form disclosed. It should be understood that the invention may be practiced with modification and alteration and that the invention be limited only by the claims and the equivalents thereof.

What is claimed is:

1. A system comprising:
    a plurality of hardware processors, wherein at least one of the plurality of hardware processors is configured to communicate over a network with a plurality of servers;
    a global site selector, executed by at least one of the plurality of hardware processors, wherein:
        the global site selector performs a global server load balancing to direct network traffic among a plurality of virtual internet protocol (VIP) addresses;
        the global site selector includes a keepalive engine to periodically poll one or more of the VIP addresses hosted on an application control engine to check whether each VIP address is in an ONLINE state or an OFFLINE state, wherein the keepalive engine of the global site selector sends one or more keepalive requests and waits for a keepalive response to the keepalive request up to a minimum keepalive interval; and
        the global site selector receives a state change information included in a VIP status notification message in response to a state change of one of the VIP addresses, in addition to and distinct from the keepalive response,
            wherein the keepalive response specifies only the ONLINE state or the OFFLINE state, respectively, the received state change information is received in less than the minimum keepalive interval between the periodic polls, and the state change information is configured to specify a state change from either ONLINE to OFFLINE or OFFLINE to ONLINE; and
    the application control engine, executed by at least one of the plurality of hardware processors and in communication with the global site selector, including a configuration manager wherein:
        the configuration manager, concurrently with creating a VIP address of the one or more of the VIP addresses hosted on the application control engine, specifies a global site selector IP address through which the application control engine sends to the global site selector the VIP status notification message for the VIP address, wherein the VIP status notification message is distinct from the keepalive response and provides the state change information; and
        the application control engine sends, independently of waiting for the minimum keepalive interval between keepalive requests, the VIP status notification message to the global site selector IP address, in direct response to the state change information for the VIP address;
    wherein the global site selector modifies the global server load balancing immediately in response to the VIP status notification message, and without waiting for the keepalive response or the minimum keepalive interval, by:
        redirecting traffic away from the VIP address if the state change transitions from the ONLINE state to the OFFLINE state, and
        directing traffic to the VIP address if the state change transitions from the OFFLINE state to the ONLINE state.

2. The system of claim 1, wherein:
the application control engine notifies the global site selector in response to a VIP address state changing from ONLINE to OFFLINE.

3. The system of claim 1, wherein:
the application control engine notifies the keepalive engine of the state change of the VIP address.

4. The system of claim 1, wherein:
the keepalive engine periodically pings the application control engine regarding the state of the VIP address; and
the application control engine notifies the keepalive engine regarding a VIP address state change independently of answering pings regarding the state of the VIP address.

5. The system of claim 1, wherein the global site selector:
processes a domain name system (DNS) request;
performs a keepalive method configured to find a site with a VIP address in an ONLINE state; and
returns the VIP address for the site in response to the request.

6. The system of claim 1, wherein the application control engine:
hosts a plurality of VIP addresses, wherein:
the application control engine keeps track of a state of each VIP address, wherein:
a set of possible states of each VIP address includes an ONLINE state and an OFFLINE state.

7. A method comprising:
performing, by a global site selector, global server load balancing to direct network traffic among a plurality of virtual internet protocol (VIP) addresses;
periodically polling by a keepalive engine of the global site selector one or more of the VIP addresses hosted on an application control engine to check whether each VIP address is in an ONLINE state or an OFFLINE state, wherein the keepalive engine of the global site selector sends one or more keepalive requests and waits for a keepalive response to the keepalive request up to a minimum keepalive interval;

receiving a state change information specifying a state change from ONLINE to OFFLINE by the global site selector, wherein:

the received state change information is included in a VIP status notification message in response to a state change of a VIP address of the one or more of the VIP addresses hosted on the application control engine, the received state change information is in addition to and distinct from the keepalive response, the keepalive response specifies only the ONLINE state or the OFFLINE state, respectively, the received state change information is received in less than the minimum keepalive interval between the periodic polls, and the state change information is configured to specify a state change from either ONLINE to OFFLINE or OFFLINE to ONLINE;

concurrently with creating the VIP address of the one or more of the VIP addresses hosted on the application control engine, specifying, by a configuration manager of the application control engine, a global site selector IP address through which the application control engine sends to the global site selector the VIP status notification message for the VIP address, wherein the VIP status notification message is distinct from the keepalive response and provides the state change information;

sending, by the application control engine independently of waiting for the minimum keepalive interval between keepalive requests, the VIP status notification message to the global site selector IP address, in direct response to the state change information for the VIP address; and modifying, by the global site selector, the global server load balancing in immediate response to the VIP status notification message including a received state change information that specifies a state change from ONLINE to OFFLINE, and without waiting for the keepalive response or the minimum keepalive interval, by redirecting traffic away from the VIP address.

8. The method of claim 7, wherein modifying the global server load balancing in response to the VIP status notification message further comprises:

in response to a subsequent VIP status notification message including a received state change information that specifies a state change from OFFLINE to ONLINE, directing traffic to the VIP address.

9. The method of claim 7, further comprising:
periodically polling the VIP address and in response to a state of the VIP address being ONLINE, using the VIP address for load balancing; and
periodically polling the VIP address and in response to the state of the VIP address being OFFLINE, directing network traffic away from the VIP address.

10. The method of claim 7, further comprising:
periodically polling the VIP address and in response to a state of the VIP address being OFFLINE, directing network traffic away from the VIP address; and
responding, independently of the periodic polling, to the VIP address state changing from ONLINE to OFFLINE and, in response to the state change, directing network traffic away from the VIP address.

11. The method of claim 7, further comprising:
processing a domain name system (DNS) request;
performing a keepalive method configured to find a site with a VIP address in an ONLINE state, and
returning the VIP address for the site in response to the request.

12. The method of claim 7, further comprising:
hosting a plurality of VIP addresses including:
keeping track of a state of each VIP address, wherein a set of possible states of each VIP address includes an ONLINE state and an OFFLINE state.

13. A computer program product comprising a non-transitory computer readable medium having computer readable and executable code for instructing a processor to perform a method, the method comprising:

performing, by a global site selector, global server load balancing to direct network traffic among a plurality of virtual internet protocol (VIP) addresses;

periodically polling by a keepalive engine of the global site selector one or more of the VIP addresses hosted on an application control engine to check whether each VIP address is in an ONLINE state or an OFFLINE state, wherein the keepalive engine of the global site selector sends one or more keepalive requests and waits for a keepalive response to the keepalive request up to a minimum keepalive interval;

receiving a state change information specifying a state change from ONLINE to OFFLINE by the global site selector, wherein:

the received state change information is included in a VIP status notification message in response to a state change of a VIP address of the one or more of the VIP addresses hosted on the application control engine, the received state change information is in addition to and distinct from the keepalive response, the keepalive response specifies only the ONLINE state or the OFFLINE state, respectively, and the received state change information is received in less than the minimum keepalive interval between the periodic polls, and the state change information is configured to specify a state change from either ONLINE to OFFLINE or OFFLINE to ONLINE;

concurrently with creating the VIP address of the one or more of the VIP addresses hosted on the application control engine, specifying, by a configuration manager of the application control engine, a global site selector IP address through which the application control engine sends to the global site selector the VIP status notification message for the VIP address, wherein the VIP status notification message is distinct from the keepalive response and provides the state change information;

sending, by the application control engine independently of waiting for the minimum keepalive interval between keepalive requests, the VIP status notification message to the global site selector IP address, in direct response to the state change information for the VIP address; and modifying, by the global site selector, the global server load balancing in immediate response to the VIP status notification message including a received state change information that specifies a state change from ONLINE to OFFLINE, and without waiting for the keepalive response or the minimum keepalive interval, by redirecting traffic away from the VIP address.

14. The computer program product of claim 13, wherein modifying the global server load balancing in response to the VIP status notification message further comprises:

in response to a subsequent VIP status notification message including a received state change information that specifies a state change from OFFLINE to ONLINE, directing network traffic to the VIP address.

15. The computer program product of claim 13, wherein the method further comprises:
periodically polling the VIP address and, in response to the VIP address being in the OFFLINE state, directing network traffic away from the VIP address; and
responding, independently of the periodic polling, to the VIP address changing from the ONLINE state to the OFFLINE state by directing network traffic away from the VIP address.

16. The computer program product of claim 13, wherein the method further comprises:
processing a domain name system (DNS) request;
performing a keepalive method configured to find a site with a VIP address in an ONLINE state, and
returning the VIP address for the site in response to the request.

17. The computer program product of claim 13, wherein the method further comprises:
hosting a plurality of VIP addresses including:
keeping track of a state of each VIP address, wherein a set of possible states of each VIP address includes an ONLINE state and an OFFLINE state.

* * * * *